United States Patent
Sha et al.

(10) Patent No.: US 7,592,052 B2
(45) Date of Patent: Sep. 22, 2009

(54) SUBSTRATE STRUCTURES, LIQUID CRYSTAL DISPLAY DEVICES AND METHODS FOR FABRICATING LIQUID CRYSTAL DISPLAY DEVICES

(75) Inventors: Yi-An Sha, Taipei (TW); Chi-Chang Liao, Tainan (TW); Hsing-Lung Wang, Taoyuan County (TW); Pei-Ju Su, Hsinchu (TW)

(73) Assignee: Industrial Technology Reseach Institute, Hsinchu (TW)

( * ) Notice: Subject to any disclaimer, the term of this patent is extended or adjusted under 35 U.S.C. 154(b) by 287 days.

(21) Appl. No.: 11/481,510

(22) Filed: Jul. 6, 2006

(65) Prior Publication Data

US 2007/0154657 A1    Jul. 5, 2007

(30) Foreign Application Priority Data

Dec. 30, 2005    (TW)  ............... 94147654 A

(51) Int. Cl.
*G03C 19/00* (2006.01)
*G03C 19/06* (2006.01)
*G03C 19/52* (2006.01)

(52) U.S. Cl. ............... 428/1.1; 428/1.2; 428/1.3; 430/20; 430/270.1; 349/158; 349/129

(58) Field of Classification Search ............ 252/299.01, 252/299.6; 430/20, 270.1; 428/1.1–1.3; 349/158, 129
See application file for complete search history.

(56) References Cited

U.S. PATENT DOCUMENTS

| | | | |
|---|---|---|---|
| 5,589,963 A | 12/1996 | Gunning, III et al. | |
| 5,859,682 A * | 1/1999 | Kim et al. | 349/124 |
| 5,953,091 A * | 9/1999 | Jones et al. | 349/129 |
| 6,862,058 B2 | 3/2005 | Ikeno et al. | |
| 2004/0155999 A1 | 8/2004 | Okumura et al. | |

FOREIGN PATENT DOCUMENTS

| | | |
|---|---|---|
| CN | 1196768 | 10/1998 |
| CN | 1687832 | 10/2005 |
| JP | 07-092467 | 4/1995 |
| TW | 200426033 | 12/2004 |
| TW | 1229225 | 3/2005 |

* cited by examiner

*Primary Examiner*—Geraldina Visconti
(74) *Attorney, Agent, or Firm*—Quintero Law Office

(57) ABSTRACT

Substrate structures, liquid crystal display devices and methods of fabricating liquid crystal display devices. A substrate structure comprises a transparent substrate having an electrode layer thereon. A first alignment layer is formed on the transparent substrate. A second alignment layer is selectively formed on the first alignment, wherein alignment orientations of liquid crystal molecules on the first and second alignment layers are different.

27 Claims, 4 Drawing Sheets

SUBSTRATE STRUCTURES, LIQUID CRYSTAL DISPLAY DEVICES AND METHODS FOR FABRICATING LIQUID CRYSTAL DISPLAY DEVICES

BACKGROUND OF THE INVENTION

1. Field of the Invention

The invention relates to liquid crystal display (LCD) devices, and in particular to substrate structures for LCD devices and fabrication methods thereof.

2. Description of the Related Art

Liquid crystal display (LCD) devices have many advantages such as small volume, light weight and low power consumption, and due to liquid crystal displays feature lighter weight, thinner profile, and increased portability are applicable in a variety of electronic and communication devices including notebook computers, personal digital assistants (PDA), mobile phones and the like.

A silicon oxide ($SiO_x$) layer is formed as an alignment layer in conventional optical compensated birefringence (OCB) mode LCD devices to improve viewing angle. The orientation of the silicon oxide ($SiO_x$) layer is determined during deposition, thereby the pre-tilt angle of liquid crystal molecules is controlled to a range between 30-60 degrees. The silicon oxide ($SiO_x$) layer, however, must be deposited in a vacuum, resulting in intricate fabrication procedures and reduced throughput.

Additionally, luminance of conventional transflective LCDs are different in transmission mode and reflection mode, leading to unsaturated images. The alignment layers in reflection and transmission regions are different to meet different pre-tilt requirements of the liquid crystal layer. For example, conventional addition of photo-catalyst in polyimide (PI) and selective exposure due to photo-chemical reaction can create different orientation alignment layers.

FIG. 1 is a schematic view of a conventional transflective LCD device with different orientation in the reflection and transmission regions. In FIG. 1, a transflective LCD comprises a lower substrate 11 such as an active device matrix substrate, an opposing upper substrate 12 with color filters 15 thereon, and a liquid crystal layer 13 interposed between the upper and lower substrates. The lower substrate 11 includes an active device array such as a thin film transistor (TFT) array on a transparent substrate. A display area of the lower substrate 11 can be divided into a reflection region R and a transmission region T. A transparent electrode 19 is formed on the lower substrate 11 and electrically connected to the thin film transistor (TFT) via a contact 20. A reflective electrode 18 is deposited on the transparent electrode 19 in the reflection region R. A vertically oriented alignment layer 21 and a horizontally oriented alignment layer 22 are respectively disposed in the reflection region R and transmission region T of the lower substrate 11. In conjunction with a horizontal oriented alignment 22 on the upper substrate 12, different optical characteristics in reflective region R and in transmission region R can thus be achieved in a transflective LCD device.

U.S. Pat. No. 6,862,058, the entirety of which is hereby incorporated by reference, discloses a transflective liquid crystal display with different alignment orientations in the reflection region and in the transmission region. Different alignment layers are separately formed in the reflection region and in the transmission region to improve viewing angle. Forming different alignment layers, however, requires intricate lithographic processes, leading to high production cost and low yield.

Japanese Patent No. 7-92 467, the entirety of which is hereby incorporated by reference, discloses a liquid crystal display device with wide viewing angle. In each pixel region, different alignment layers are formed by lithography and etching, leading to high production cost and low yield.

BRIEF SUMMARY OF THE INVENTION

A detailed description is given in the following embodiments with reference to the accompanying drawings.

Accordingly, different pre-tilt angles and/or multiple alignment regions of liquid crystal molecules in a single LCD device, such as a multi-domain vertical alignment (MVA) mode LCD, an optically compensated birefringence (OCB) mode LCD, or a transflective mode LCD, are desired to improve viewing angle, brightness, contrast ratio, and aperture of the LCD device.

According to an embodiment of the invention, a substrate structure for a liquid crystal display device is provided. The substrate structure comprises a substrate with an electrode layer thereon, a first alignment layer disposed on the substrate, and a second alignment layer selectively disposed on the first alignment layer, wherein orientations of liquid crystal molecules on the first alignment layer and on the second alignment layer are different.

According to another embodiment of the invention, a liquid crystal display device comprises a first substrate, a second substrate opposing the first substrate, and a liquid crystal layer interposed between the first and the second substrates. The first substrate includes an electrode layer thereon. A first alignment layer is disposed on the first substrate. A second alignment layer is selectively disposed on the first alignment layer, wherein orientations of liquid crystal molecules on the first alignment layer and on the second alignment layer are different.

According to another embodiment of the invention, a method for fabricating a liquid crystal display device is provided. A substrate with an electrode layer thereon is provided. A first alignment layer is applied on the substrate. A second alignment layer selectively formed on the first alignment layer by inkjet printing, wherein orientations of liquid crystal molecules on the first alignment layer and on the second alignment layer are different.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
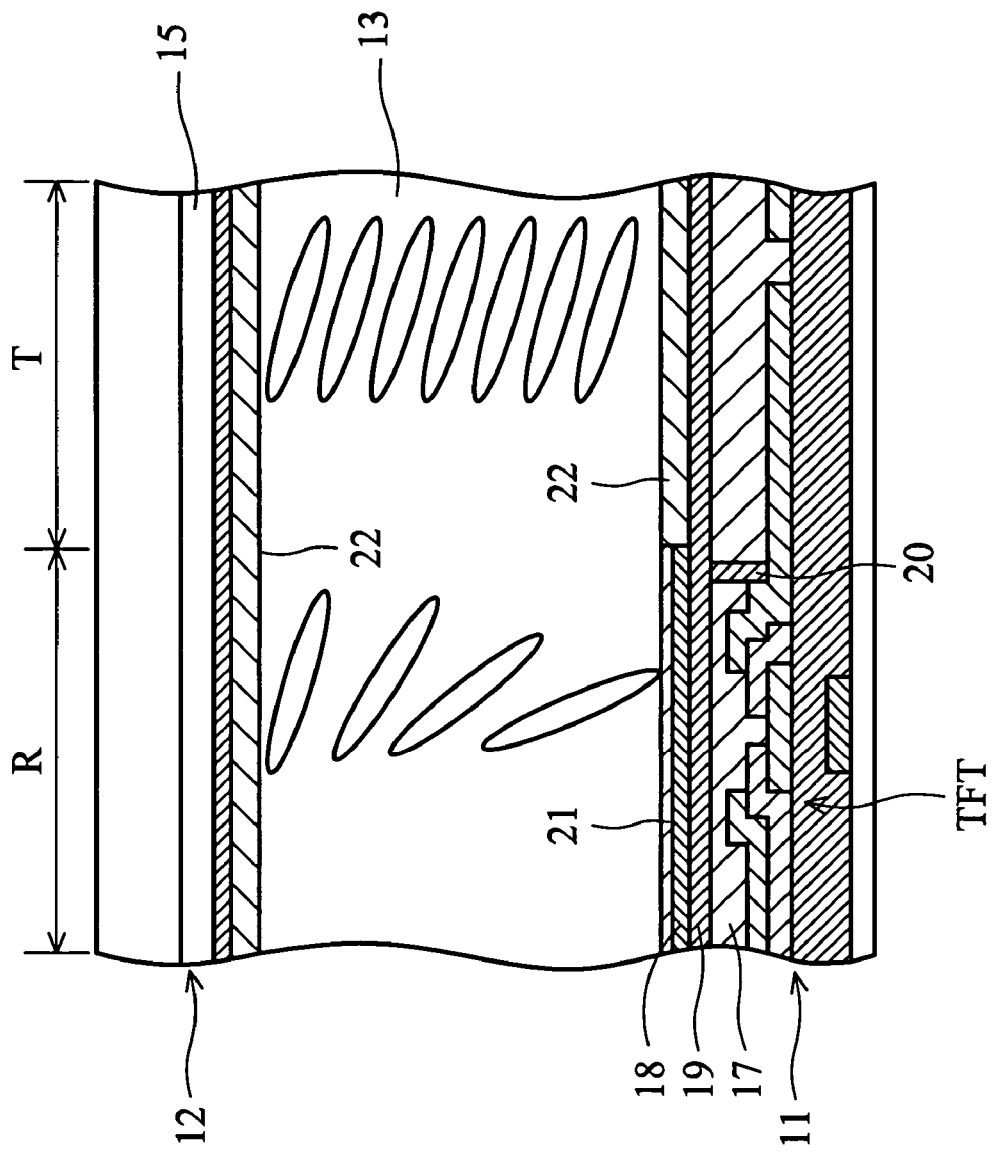
FIG. 1 is a schematic view of a conventional transflective LCD device with different orientation in the reflection and transmission regions.
Figure 2:
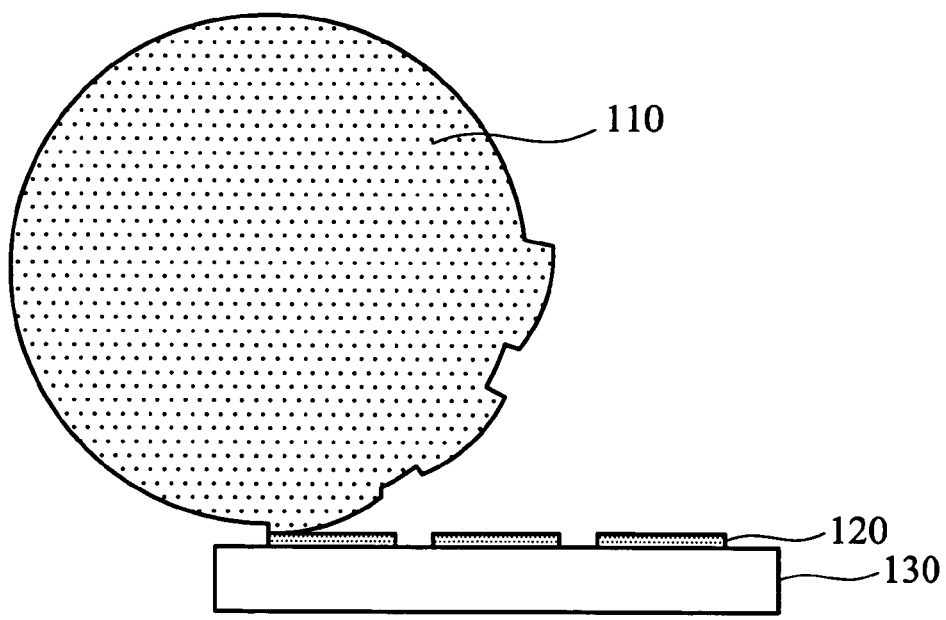
FIG. 2 is schematic view of applying an alignment layer on a substrate according to an embodiment of the invention.

FIG. 2 is schematic view of applying an alignment layer on a substrate according to an embodiment of the invention. The first alignment layer may comprise polyvinyl alcohol (PVA), polyimide (PI), polyamide (PA), polyurea (PU), nylon, or lecithin. The alignment layer is preferably applied by a roller on a large scale substrate.

Figure 3:
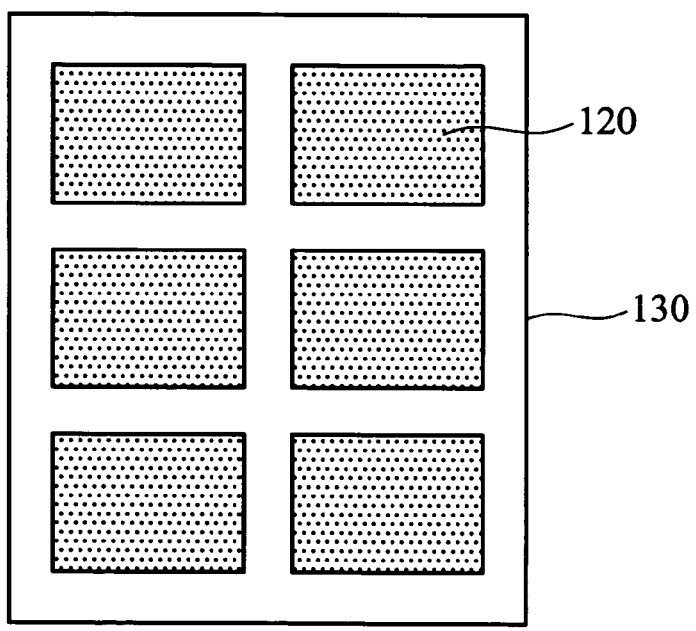
FIG. 3 is a plan view illustrating the patterned alignment layer on a substrate formed by the step as shown in FIG. 2.

Referring to FIG. 3, a substrate 130 with an electrode layer or other elements such as color filters (not shown) is provided. The substrate 130 comprises a glass substrate, metal substrate, or a transparent plastic substrate. The substrate 130 further comprises an array of active control devices including thin film transistors (TFTs). The electrode comprises organic conductive material or inorganic conductive material. Alternatively, the substrate 130 can be an opposing substrate with a color filter layer thereon. Sequentially, a relief (or anastatic) printing plate with predetermined patterns is attached on a roller 110. A first patterned alignment layer 120 is preferably applied by the roller 110 on a large scale substrate 130.

Note that the first patterned alignment layer 120 of FIG. 3 is not limited to representing the entire display region of an LCD device. The first patterned alignment layer 120 may represent only a single pixel region or a plurality pixel regions.

Figure 4:
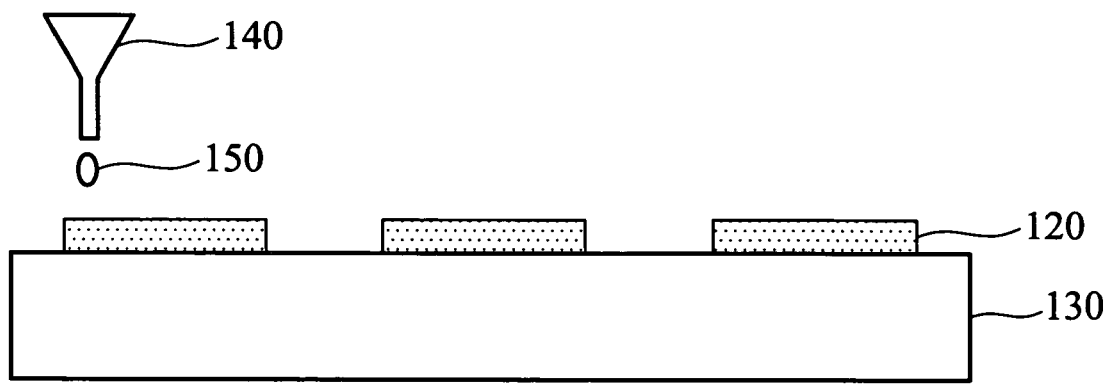
FIG. 4 is a cross section of forming a second alignment layer on the first patterned alignment layer according to an embodiment of the invention.

FIG. 4 is a cross section of forming a second alignment layer on the first patterned alignment layer according to an embodiment of the invention. Referring to FIG. 4, a second alignment layer 150' is preferably applied on the first patterned alignment layer 120 by inkjet printing. For example, a fluid injector device 140, such as a thermal bubble driven inkjet printhead or a piezoelectric diaphragm driven inkjet printhead, can inject droplets 150 of alignment material on the first alignment layer 120. The location and dimensions of the second alignment layer 150' can be achieved by controlling the position of the fluid injector device 140 and the volume of the droplet 150. The second alignment layer may comprise polyvinyl alcohol (PVA), polyimide (PI), polyamide (PA), polyurea (PU), nylon, or lecithin. An aligning procedure such as rubbing is subsequently performed after an 180° C. baking procedure.

Figure 5:
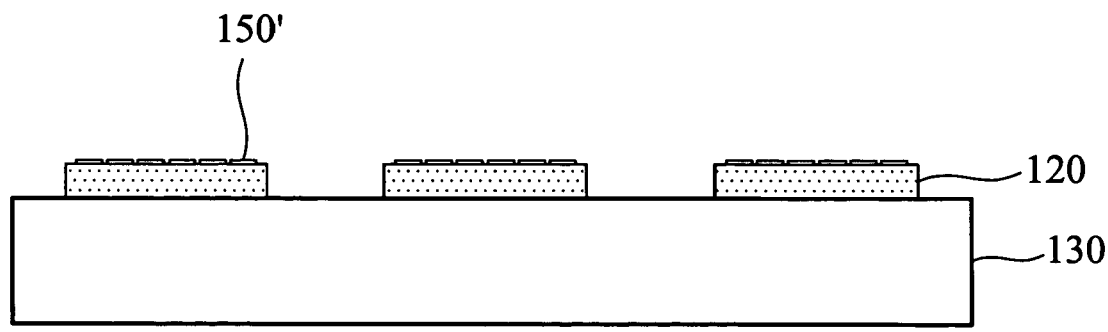
FIG. 5 is a cross section of a second patterned alignment layer on the first patterned alignment layer according to an embodiment of the invention.

FIG. 5 is a cross section of a second patterned alignment layer on the first patterned alignment layer according to an embodiment of the invention. In FIG. 5, the second alignment material 150' is precisely printed at predetermined sites on the first alignment layer 120, exposing part of the first alignment layer 120. By selecting different materials for the first and the second alignment layers, different liquid crystal orientations can be achieved in a single LCD device, thereby widening the viewing angle.

Accordingly, the relationship between the first and the second alignment layers depends on types of the LCD device, such as a multi-domain vertical alignment (MVA) mode LCD, an optically compensated birefringence (OCB) mode LCD, or a transflective mode LCD. For example, when applying to a transflective mode LCD, the second alignment layer 150' is disposed on the reflection region, exposing the first alignment layer 120 at the transmission region. By selecting different materials for the first and the second alignment layers, different liquid crystal orientations can be achieved corresponding to the transmission and reflection regions separately, thereby improving display quality of the transflective LCD device.

Alternatively, the first and the second alignment layers can be selected from materials with different polarities, as different polarities can cause different liquid crystal orientations due to surface tensions between the alignment layers and the liquid crystal layer.

According to an embodiment of the invention, the first alignment layer 120 preferably provides a vertical liquid crystal molecule orientation, i.e., a longitudinal axis of the liquid crystal molecule is pre-tilted 75-90 degrees against the first alignment layer 120, while the second alignment layer 150' provides a horizontal liquid crystal molecule orientation, i.e., a longitudinal axis of the liquid crystal molecule is pre-tilted 0-15 degrees against the second alignment layer 150'. Alternatively, the first alignment layer 120 provides a horizontal liquid crystal molecule orientation, i.e., a longitudinal axis of the liquid crystal molecule is pre-tilted 0-15 degrees against the alignment layer 70, while the second alignment layer 150' provides a vertical liquid crystal molecule orientation, i.e., a longitudinal axis of the liquid crystal molecule is pre-tilted 75-90 degrees against the second alignment layer 150'.

Figure 6:
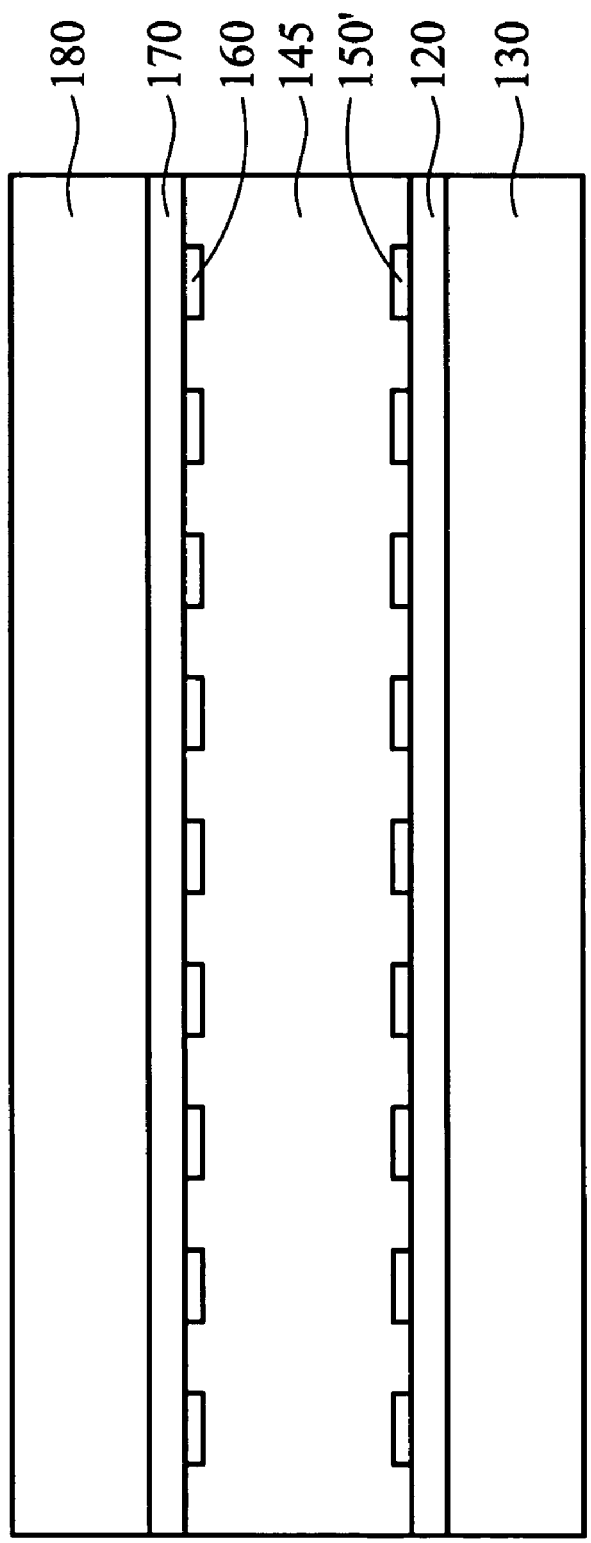
FIG. 6 is a cross section of a liquid crystal display device including a substrate of FIG. 5 according to an embodiment of the invention.

FIG. 6 is a cross section of a liquid crystal display device including a substrate of FIG. 5 according to an embodiment of the invention. Referring to FIG. 6, a liquid crystal display device 100 comprises a first substrate 130, a second substrate 180 opposing the first substrate 130, and a liquid crystal layer 145 interposed between the first substrate 130 and the second substrate 180. The first substrate 130 comprises an electrode layer (not shown) to serve as a pixel electrode controlling liquid crystal molecule orientations. A first alignment layer 120 is disposed on the first substrate 130. A second alignment layer 150' is selectively disposed on the first alignment layer 120, exposing part of the first alignment layer 120. The alignment orientations and pre-tilt angles of liquid crystal molecules on the first alignment layer 120 and on the second alignment layer 150' are different.

The first substrate 130 comprises an electrode layer (not shown) to serve as a common electrode controlling liquid crystal molecule orientations. A third alignment layer 170 is disposed on the second substrate 180. A fourth alignment layer 160 is selectively disposed on the third alignment layer 170, exposing part of the third alignment layer 170. The alignment orientations and pre-tilt angles of liquid crystal molecules on the third alignment layer 170 and on the fourth alignment layer 160 are different.

The invention is advantageous in that different pre-tilt angles and/or multiple alignment regions of liquid crystal molecules in a single LCD device, such as a multi-domain vertical alignment (MVA) mode LCD, an optically compensated birefringence (OCB) mode LCD, or a transflective mode LCD, can be achieved. Moreover, different alignment materials can be applied by different methods including relief (or anastatic) printing and inkjet printing at different regions, thereby improving viewing angle, bright, contrast ratio, and aperture of the LCD device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A substrate structure for a liquid crystal display device, comprising:
   a substrate with an electrode layer thereon;
   a first alignment layer disposed on the substrate; and
   a second alignment layer selectively disposed on the first alignment layer;
   wherein orientations of liquid crystal molecules on the first alignment layer and on the second alignment layer are different,
   wherein the first alignment layer provides a vertical liquid crystal molecule orientation, wherein a longitudinal axis of the liquid crystal molecule is pre-tilted 75-90 degrees against the first alignment layer; and
   wherein the second alignment layer provides a horizontal liquid crystal molecule orientation, wherein a longitudinal axis of the liquid crystal molecule is pre-tilted 0-15 degrees against the second alignment layer.

2. The substrate structure as claimed in claim 1, wherein the substrate comprises a glass substrate and a plastic substrate.

3. The substrate structure as claimed in claim 1, wherein the substrate structure is an active matrix substrate with transparent electrodes thereon.

4. The substrate structure as claimed in claim 1, wherein the substrate structure is a color filter substrate.

5. The substrate structure as claimed in claim 1, wherein the first alignment layer and the second alignment have different polarities.

6. The substrate structure as claimed in claim 1, wherein the first alignment layer comprises polyvinyl alcohol (PVA), polyimide (Pl), polyamide (PA), polyurea (PU), nylon, or lecithin.

7. The substrate structure as claimed in claim 1, wherein the second alignment layer comprises polyvinyl alcohol (PVA), polyimide (Pl), polyamide (PA), polyurea (PU), nylon, or lecithin.

8. The substrate structure as claimed in claim 1, wherein the second alignment layer is formed by printing, or inkjet printing on the first alignment layer.

9. A substrate structure for a liquid crystal display device, comprising:
   a substrate with an electrode layer thereon;
   a first alignment layer disposed on the substrate; and
   a second alignment layer selectively disposed on the first alignment layer;
   wherein orientations of liquid crystal molecules on the first alignment layer and on the second alignment layer are different,
   wherein the first alignment layer provides a horizontal liquid crystal molecule orientation, wherein a longitudinal axis of the liquid crystal molecule is pre-tilted 0-15 degrees against the first alignment layer; and
   wherein the second alignment layer provides a vertical liquid crystal molecule orientation, wherein a longitudinal axis of the liquid crystal molecule is pre-tilted 75-90 degrees against the second alignment layer.

10. A liquid crystal display device, comprising:
    a first substrate with an electrode layer thereon;
    a first alignment layer disposed on the first substrate; and
    a second alignment layer selectively disposed on the first alignment layer;
    a second substrate opposing the first substrate; and
    a liquid crystal layer interposed between the first and the second substrates,
    wherein the first alignment layer provides a vertical liquid crystal molecule orientation, wherein a longitudinal axis of the liquid crystal molecule is pre-tilted 75-90 degrees against the first alignment layer; and
    wherein the second alignment layer provides a horizontal liquid crystal molecule orientation, wherein a longitudinal axis of the liquid crystal molecule is pre-tilted 0-15 degrees against the second alignment layer.

11. The liquid crystal display device as claimed in claim 10, wherein the second substrate comprises a first alignment layer and a second alignment layer selectively disposed on the first alignment layer, wherein orientations of liquid crystal molecules on the first alignment layer and on the second alignment layer are different.

12. The liquid crystal display device as claimed in claim 10, wherein the liquid crystal layer comprises a twisted nematic liquid crystal, a cholesteric liquid crystal, a sematic liquid crystal, a disk-shape liquid crystal, or a liquid phase liquid crystal.

13. The liquid crystal display device as claimed in claim 10, wherein the liquid crystal display device comprises an optical compensated birefringence (OCB) liquid crystal display, wherein the first alignment layer provides a horizontal liquid crystal molecule orientation and the second alignment layer provides a vertical liquid crystal molecule orientation.

14. The liquid crystal display device as claimed in claim 10, wherein the liquid crystal display device comprises an optical compensated birefringence (OCB) liquid crystal display, wherein the first alignment layer provides a vertical liquid crystal molecule orientation and the second alignment layer provides a horizontal liquid crystal molecule orientation.

15. The liquid crystal display device as claimed in claim 10, wherein the liquid crystal display device comprises a single gap transflective liquid crystal display, wherein the first and the second alignment layers respectively correspond to a transmission region and a reflection region.

16. The liquid crystal display device as claimed in claim 10, wherein the liquid crystal display device comprises a multiple-domain vertical alignment liquid crystal display, wherein the first and the second alignment layers provide different liquid crystal molecule orientation, thereby increasing viewing angle.

17. A liquid crystal display device, comprising:
    a first substrate with an electrode layer thereon;
    a first alignment layer disposed on the first substrate; and
    a second alignment layer selectively disposed on the first alignment layer;
    a second substrate opposing the first substrate; and
    a liquid crystal layer interposed between the first and the second substrates,
    wherein the first alignment layer provides a horizontal liquid crystal molecule orientation, wherein a longitudinal axis of the liquid crystal molecule is pre-tilted 0-15 degrees against the first alignment layer; and
    wherein the second alignment layer provides a vertical liquid crystal molecule orientation, wherein a longitudinal axis of the liquid crystal molecule is pre-tilted 75-90 degrees against the second alignment layer.

18. A method for fabricating a substrate structure for a liquid crystal display device, comprising:
    providing a substrate with an electrode layer thereon;
    applying a first alignment layer on the substrate; and
    selectively forming a second alignment layer on the first alignment layer;
    wherein orientations of liquid crystal molecules on the first alignment layer and on the second alignment layer are different, wherein the step of applying a first alignment layer comprises rolling, spin coating, spraying, or ink-jet printing, and wherein the second alignment layer is formed by spraying or ink-jet printing on the first alignment layer.

19. The method as claimed in claim 18, after the step of applying a first alignment layer, further comprising a soft baking procedure.

20. The method as claimed in claim 18, after the step of applying a first alignment layer, further comprising a soft baking procedure and a hard baking procedure.

21. The method as claimed in claim 18, after the step of forming a second alignment layer on the first alignment layer, further comprising a soft baking procedure and a hard baking procedure.

22. The method as claimed in claim 18, wherein the first alignment layer and the second alignment have different polarities.

23. The method as claimed in claim 18, wherein the first alignment layer comprises polyvinyl alcohol (PVA), polyimide (Pl), polyamide (PA), polyurea (PU), nylon, or lecithin.

24. The method as claimed in claim 18, wherein the second alignment layer comprises polyvinyl alcohol (PVA), polyimide (Pl), polyamide (PA), polyurea (PU), nylon, or lecithin.

25. The method as claimed in claim 18, wherein the first alignment layer provides a vertical liquid crystal molecule orientation and the second alignment layer provides a horizontal liquid crystal molecule orientation.

26. The method as claimed in claim 18, wherein the first alignment layer provides a vertical liquid crystal molecule orientation, wherein a longitudinal axis of the liquid crystal molecule is pre-tilted 75-90 degrees against the first alignment layer; and wherein the second alignment layer provides a horizontal liquid crystal molecule orientation, wherein a longitudinal axis of the liquid crystal molecule is pre-tilted 0-15 degrees against the second alignment layer.

27. The method as claimed in claim 18, wherein the first alignment layer provides a vertical liquid crystal molecule orientation, wherein a longitudinal axis of the liquid crystal molecule is pre-tilted 0-15 degrees against the first alignment layer; and wherein the second alignment layer provides a vertical liquid crystal molecule orientation, wherein a longitudinal axis of the liquid crystal molecule is pre-tilted 75-90 degrees against the second alignment layer.

* * * * *

UNITED STATES PATENT AND TRADEMARK OFFICE
CERTIFICATE OF CORRECTION

PATENT NO.      : 7,592,052 B2                          Page 1 of 1
APPLICATION NO. : 11/481510
DATED           : September 22, 2009
INVENTOR(S)     : Sha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this

Fourteenth Day of December, 2010

David J. Kappos
*Director of the United States Patent and Trademark Office*